United States Patent [19]
Willett

[11] 3,933,675

[45] Jan. 20, 1976

[54] CURING AGENTS

[75] Inventor: Joseph Theodore Willett, Clayton, Mich.

[73] Assignee: Anderson Development Company, Adrian, Mich.

[22] Filed: Apr. 3, 1974

[21] Appl. No.: 457,488

[52] U.S. Cl........ 252/182; 260/77.5 AN; 260/471 R
[51] Int. Cl.$^2$.......................................... C08G 71/04
[58] Field of Search.... 260/471 R, 77.5 AN, 570 D; 252/182

[56] References Cited
UNITED STATES PATENTS 3,629,168  12/1971  Ryan ............................. 260/18 TN

*Primary Examiner*—Lorraine A. Weinberger
*Assistant Examiner*—L. A. Thaxton
*Attorney, Agent, or Firm*—Hugo E. Weisberger

[57] ABSTRACT

Improved curing agents having long pot life for use with urethane elastomers are prepared by reacting orthochloroaniline, an ester of anthranilic acid, and formaldehyde in selected molar ratios in an acid medium.

6 Claims, No Drawings

CURING AGENTS

BACKGROUND OF THE INVENTION

It has been long known in the prior art to employ aromatic diamines, including various unsubstituted or substituted methylene-dianilines as curing agents for polyurethanes as well as for epoxy resins. Ring substituents in the aniline molecule have included halogen, as well as alkyl, alkoxy, and carboxyalkyl groups. The resulting diamine type curing agents have been found essential to impart strength and toughness to the resins to which they are applied. However, the known diamine type materials differ widely in their curative action, and most are too fast-acting to be of practical importance.

At the present time, the most widely used curing agent for the foregoing types of polymers is the compound 4,4'-methylene bis-orthochloroaniline, which is available commercially under the designations MOCA and Curene 442. Owing to steric hindrance and electronic effect of the amino group, this diamine possesses satisfactory pot life and also imparts excellent physical properties to the resin products with which it is employed. However, this compound is toxic, and is also a suspected carcinogen. Recently promulgated federal regulations relating to occupational safety and health restrict work-place exposure to this substance.

Another diamine which has been employed for curative purposes in connection with diamine cured polyurethane compositions is methylene bis methyl anthranilate, known as MMA, the use of which is mentioned in U.S. Pat. Nos. 3,188,302 and 3,629,168. However, this substance exhibits a very short pot life and imparts poor physical properties to urethane elastomers.

Another disadvantage of the agent 4,4-methylene bisorthochloroaniline is its tendency to undergo discolorization when kept in the molten state for prolonged periods, such as several hours. This may adversely affect the color of the polyurethane vulcanizate, and may require the addition of a color stabilizer such as an alkali metal hydroxide thereto, as described in U.S. Pat. No. 3,393,239.

The conventional method of preparation of the methylene dianiline curing agents of the prior art has been to condense formaldehyde with one or more substituted anilines under acid conditions, and in specified molar ratios. Where more than one aniline or substituted aniline is reacted, it is not certain whether a single molecular compound is produced, or rather a mixture of individual diamines each derived from reaction between the formaldehyde and a particular aniline. In some instances the products are believed to be mixtures of isomeric polyamines. Hence such curing agents are conventionally characterized as prepared by condensing the various compounds in the presence of an acid in specified molar ratios.

The diamine curing agents are conventionally blended with the polyurethane prepolymers by uniformly dispersing them therein, either directly or via a liquid diluent. They are similarly blended with uncured epoxy resins.

GENERAL DESCRIPTION OF THE INVENTION

In accordance with the present invention there is provided a novel class of diamine curing agents and a novel process for their preparation. These agents function as curatives for urethane elastomers. They are prepared by reacting a mixture of an anthranilic acid ester and orthochloroaniline with formaldehyde in an acid medium. The resulting product is believed to represent a mixture of polyamine isomers.

Under the reaction conditions of the invention, the proportion of 4,4'-methylene bis-orthochloroaniline present in the resulting polyamine mixture is preferably kept so low that the resulting curing agent is substantially nontoxic under the standards of the Federal Hazardous Substances Labelling Act.

The curing compositions of the invention are exceptionally stable and possess a working pot life equal to or better than that of 4,4'-methylene bis-orthochloroaniline. At the same time, they impart excellent physical properties to both polyether and polyester prepolymers of urethane elastomers. In contrast to most known curatives, the curing agents of the invention impart longer working pot life as the temperature of the urethane system is increased.

In preparing the curing agents of the invention, there is generally employed a major proportion of the anthranilic acid ester and a minor proportion of the orthochloroaniline. Depending on the anthranilic acid ester and the particular proportions, the resulting reaction product may be an oily liquid or a solid having a well defined melting temperature range.

The curing activity and the pot life of the novel products of the invention are dependent upon the molar ratio of orthochloroanline acid ester, and also upon the molar ratio of the total quantity of reacting amines to formaldehyde. In accordance with the invention, the molar ratio of orthochloroaniline to anthranilic acid ester is in the range of 1:99 to 50:50, preferably in the range of 1:99 to 10:90. The amount of formaldehyde (100%) employed represents a molar ratio of total amines to formaldehyde in the range of about 1.5:1 to 10:1.

The anthranilic acid esters employed in the practice of the invention are preferably lower alkyl esters, or mixtures thereof, in which the alkyl may be straight or branched chain alkyl. Examples of suitable esters include methyl, ethyl, n-propyl, isopropyl, n-butyl, isobutyl, tert.-butyl, and amyl esters. Methyl anthranilate is preferred.

The acid employed for the condensation may be any strong inorganic acid or organic carboxylic acid, or mixtures thereof, of the type conventionally used in this type of reaction. Examples of suitable acids include hydrochloric, sulfuric, nitric, and phosphoric acids, p-toluenesulfonic acid, and trichloroacetic acid, with hydrochloric acid being preferred. The quantity of acid employed represents at least about 0.5 equivalent per mol of total amines up to about 10 equivalents, depending upon reaction conditions, preferably in the range of about 1 to 2 equivalents.

The condensation is advantageously performed in an aqueous medium, but it may also be performed in an organic solvent, such as a lower alkanol, for example methanol, ethanol, or propanol or butanol.

The resulting curative representing a mixture of diamines consisting primarily of (A) methylene-bis-orthochloraniline; (B) 4,4' -diamino-2-chloro-2'-carboalkoxydiphenylmethane; and (C) methylene-bis-alkylanthranilate, is believed to be formed in accordance with the following reaction scheme:

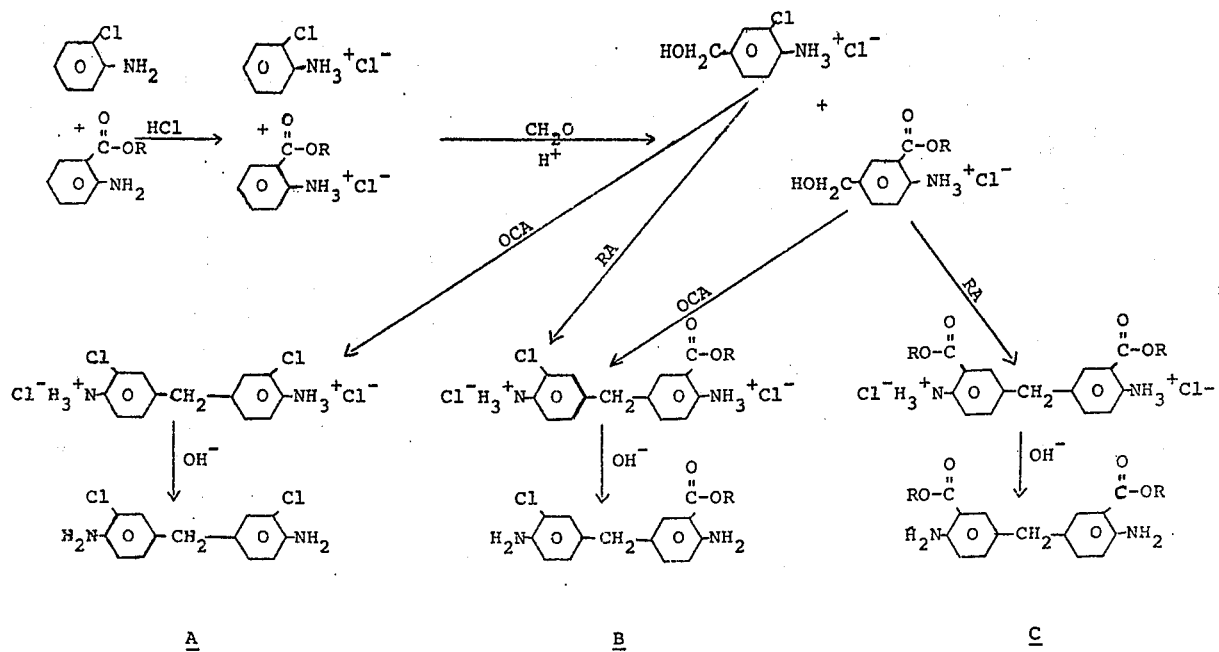

A          B          C

The condensation reaction is performed at slightly elevated temperature, preferably in the range of about 60° to about 150°C., and at atmospheric pressure.

Compound B, which can result from two different routes in the above mechanism could not result from simple mixtures of A and C and is believed to be responsible for the efficacy of the curative.

Furthermore, minor amounts of condensation products ortho to the amine function and difunctional are possible. Schiff base intermediates are also a possible explanation for the observed products which rearrange in the acid medium to diamine curatives or to unreactive by-products or triaryl species. The approximate quantities of these three species relative to the total diamine content of the curative are dependent on the mole ratio of OCA and methyl anthranilate as seen from the following table.

| Mole% OCA | Mole % MA | %A | %B | %C |
|---|---|---|---|---|
| 50 | 50 | 21–29 | 51–57 | 21 |
| 25 | 75 | 14 | 38 | 48 |
| 10 | 90 | 5 | 15 | 80 |
| 3 | 97 | <1 | 4 | 95 |

The curatives have a higher equivalent weight than 4,4' methylenebis-orthochloroaniline and may be incorporated with the resins to which they are to be added with standard equipment and techniques.

The products in the lower percentages of ortho-chloroaniline are of low toxicity, the acute oral dosage ($LD_{50}$) in rats being in excess of 1000 mg per kg of body weight.

Polyurethane elastomers having improved properties may be prepared with the use of the curing agents of the invention, by reacting a suitable prepolymer with the curing agent at a temperature in the range of about 190° to 200°F (87° to 93°C).

The urethane elastomers with which the curing agents may be incorporated may be made from isocyanate terminated prepolymers, prepared by interacting various glycols or glycol ethers and organic isocyanates. The prepolymers are thus polyesters or polyethers, and the curing agents of the invention may be uniformly distributed therein either directly or in a suitable diluent, in accordance with conventional practice. The amount of curative will generally be in the range of about 12 to 15 pounds per 100 pounds of prepolymer.

The isocyanates which may be used to form the prepolymers include, for example, 2,4-toluene diisocyanate, mixtures thereof with 2,6-toluene diisocyanate, hexamethylene diisocyanate, and the like.

By reacting the isocyanates with a molar excess of a compound containing a plurality of hydroxy or carboxy groups, there are obtained the prepolymers. Where the compounds that are reacted with the isocyanates are polyesters, the latter are generally made by reacting di- or polyhydric alcohols with dicarboxylic acids. Examples of dihydric alcohols suitable for the preparation of polyester prepolymers include ethylene glycol, diethylene glycol, triethyleneglycol, propylene glycol, 1,4- and 1,2- butanediol, and the like. Examples of dicarboxylic acids include adipic acid, sebacic acid, azelaic acid, and others.

By reacting the isocyanates with polyoxyalkylene polyols, such as polyoxyethylene glycol, polyoxypropylene glycol, and various reaction products of glycols with alkylene oxides, such as ethylene oxide or propylene oxide, or mixtures thereof, there are obtained polyether prepolymers, for the curing of which the curing agents of the invention are also suitable.

Examples of polyurethane prepolymers which may be advantageously employed in the practice of the invention are those sold commercially under the designations Adiprene L 100, or Vibrathane B 600.

The prepolymers used in the examples below to evaluate the curatives of the invention are isocyanate-terminated prepolymers of conventional types, such as, for example a prepolymer made by reacting a suitable polyol with a suitable amount of a diisocyanate, whereby the resulting products have a free —NCO content above about 4%, ranging up to about 20%. A suitable prepolymer is that made by reacting polytetramethylene ether glycol with 2,4-tolylene diisocyanate.

The following Table 1 demonstrates the improved pot life attainable with a typical curing agent of the invention, using a polyurethane polyether prepolymer having a 4.1% free NCO content made by reacting 1 mole of polytetramethyleneether glycol having a number average molecular weight of about 1000 with 1.6 moles of 2.4 toluene diisocyanate, and admixing therewith the curing agent prepared according to the method of Example 1, below, with three different molar ratios of amine components, indicating the respective viscosities (in centipoises) at the end of various periods of time from 2 to 11 minutes.

TABLE 1

| VISCOSITY IN CPS | METHYLANTHRANILATE-ORTHOCHLOROANILINE | | |
|---|---|---|---|
| | 99/1 | 97/3 | 90/10 |
| 2 minutes | 400 | 1000 | 1000 |
| 4 | 1200 | 1800 | 2000 |
| 6 | 3400 | 3000 | 6000 |
| 7 | 5400 | 4100 | 8000 |
| 8 | 8000 | 6300 | 11200 |
| 10 | 22000 | 15000 | 21800 |
| 11 | 24800 | 28500 | 28000 |

A comparison of the physical properties of urethane elastomers made from the polyurethane polyether of Table 1, when cured with methylene-bis-methyl anthranilate (MMA) and with the curing agent prepared according to Example 2, below, is shown in Table 2.

TABLE 2

| | MMA | COMPOSITION OF EXAMPLE 2 |
|---|---|---|
| Shore Hardness | A 85 – D 30 | A 91 – D 41 |
| Tensile, psi | 3560 | 4640 |
| Elongation, % | 440 | 470 |
| Die C, pi | 320 | 525 |
| Trouser Tear, pi | 47 | 98 |
| 50% modulus, psi | 600 | 900 |
| 100% modulus, psi | 815 | 1230 |
| 300% modulus, psi | 2150 | 2270 |

It will be seen from Table 2 that the curing agent of the invention imparts substantially higher hardness, tensile strength, and elasticity properties to the urethane elastomer.

DESCRIPTION OF THE PREFERRED EMBODIMENTS

The following examples illustrate the practice of the invention, but are not to be regarded as limiting:

EXAMPLE 1

A 3-liter flask equipped with an agitator, condenser and receiver for vacuum distillation is charged with 940 cc water, and then 775 gm of 32% hydrochloric acid are added with agitation. Then 923.1 gm of methyl anthranilate and 8.1 gm orthochloroaniline are added. After mixing for 5 minutes, there are added 80 grams of an aqueous solution containing 37.5% formaldehyde by weight. The reaction mixture is heated to 90°C and maintained at that temperature for 1 hour.

The reaction mixture is then neutralized with 33% sodium hydroxide solution, a precipitate forms which is separated from the aqueous phase. Vacuum and heat are applied to remove excess water, methyl anthranilate and orthochloroaniline. There remains a dark reddish amber oil which can be admixed directly with a urethane prepolymer for curing, or allowed to cool and solidify.

EXAMPLE 2

The following reaction ingredients were employed in the amounts indicated:

| Water | 840 cc |
|---|---|
| Hydrochloric acid (32%) | 549.3 gm |
| Methyl anthranilate | 885.9 gm |
| Orthochloroaniline | 39.3 gm |
| Formaldehyde (as 37.5%) solution | 80.0 gm | the reaction was performed using the same equipment and procedure as in Example 1. The product after cooling was a tan solid containing 9.7% by weight of —NH$_2$ groups.

EXAMPLE 3

Proceeding as in Examples 1 and 2, the following reaction ingredients were employed in the amounts indicated:

| Water | 840 cc |
|---|---|
| Hydrochloric acid (32%) | 549.3 gm |
| Methyl anthranilate | 839.1 gm |
| Orthochloroaniline | 78.3 gm |
| Formaldehyde (37.5% solution) | 80.0 gm |

The product in this example was a tan solid having 9.0% by weight of —NH$_2$ groups.

EXAMPLE 4

Another method of producing this curative is as follows:

A 2-liter flask equipped with an agitator and reflux condenser is charged with 685.5 gm of water and 200.5 gm of 32% hydrochloric acid are added with agitation. Then 246.5 gm of methyl anthranilate and 5.9 gm of orthochloroaniline are added. The mixture is heated to 70°C and 65.8 gm of formaldehyde in the form of a 37.5% aqueous solution is added slowly. The reaction is then allowed to reflux for 60 minutes. After reflux the reaction is cooled to 70°C and neutralized with a 33% aqueous solution of NaOH. The precipitate is filtered, washed, and dried in an oven at 105°C for 3 hours. The resultant product is a tan granular material which melts between 140°–160°C and is capable of reacting with a polyurethane prepolymer.

EXAMPLE 5

The following ingredients were employed in the amounts indicated:

| | |
|---|---|
| Water | 685.5 gm |
| Hydrochloric Acid 32% | 200.5 gm |
| Ethyl Anthranilate | 313.3 gm |
| Orthochloroaniline | 5.9 gm |
| Formaldehyde 37.5% | 65.8 gm |
| Sodium Hydroxide 33.3% | 211.3 gm |

The same equipment and initial procedure as described in Example 4 was used. The product obtained after neutralization, however, was a dark reddish amber liquid which was phase separated and dried by vacuum stripping. The resultant oily viscous liquid solidified while standing for several days.

The following characteristics of the curative were obtained:

| | |
|---|---|
| % $NH_2$ | 9.42 |
| Equivalent Weight | 170 |
| Physical Appearance | Solid |
| Color | Tan |
| Stability | Good |
| Odor | Slight |

An elastomer was made by reacting this curative with a polyether prepolymer made by reacting 1 mole of polytetramethylene ether glycol with an average molecular weight of about 1000, with 1–6 moles of 2,4-tolylene diisocyanate containing 4% free NCO. The following properties were determined:

| | |
|---|---|
| Hardness, Shore A | 60 |
| Modulus, psi | |
| 100% | 250 |
| 200% | 300 |
| 300% | 350 |
| Tensile, psi | 425 |
| Elongation, % | 400 |

EXAMPLE 6

In the same manner as Examples 4 and 5. The following ingredients were combined:

| | |
|---|---|
| Water | 685.5 gm |
| Hydrochloric Acid 32% | 200.5 gm |
| n-Propyl Anthranilate | 292.2 gm |
| Orthochloroaniline | 5.9 gm |
| Formaldehyde 37.5% | 65.8 gm |
| Sodium Hydroxide 33.3% | 211.3 gm |

An oily viscous liquid was phase separated after neutralization. Water was removed by vacuum stripping leaving an oily dark reddish amber liquid. The following values were obtained:

| | |
|---|---|
| % $NH_2$ | 8.61 |
| Equivalent Weight | 186 |
| Physical Appearance (melted) | Clear Liquid |
| Color | Dark Reddish Amber |
| Stability | Good |
| Odor | Slight |

An elastomer was made using this liquid curative and a polyether, prepolymer containing 4% free NCO. The following physical properties were measured in the elastomer.

| | |
|---|---|
| Hardness, Shore A | 70 |
| Modulus, psi | |
| 100% | 272 |
| 200% | 297 |
| 300% | 375 |
| Tensile, psi | 769 |
| Elongation, % | 520 |

What is claimed is:

1. A curing agent for polyurethane prepolymers which is a mixture consisting essentially of (A) methylene-bis-orthochloroaniline; (B) 4,4'-diamino-2-chloro-2'-carbo-lower-alkoxydiphenylmethane; and (C) methylene-bis-lower-alkylanthranilate.

2. The composition of claim 1 in which said carbo-lower-alkoxy is carbomethoxy, and said methylene-bis-lower-alkyl anthranilate is methylene-bis- methyl anthranilate.

3. The composition of claim 1 in which the methylene-bis-lower-alkyl anthranilate is methylene-bis-methyl anthranilate.

4. The composition of claim 1 in which the methylene-bis-lower-alkyl anthranilate is methylene-bis-ethyl anthranilate.

5. The composition of claim 1 in which the methylene-bis-lower-alkyl anthranilate is methylene-bis-propyl anthranilate.

6. The composition of claim 1 in which the methylene-bis-lower-alkyl anthranilate is a mixture of methylene-bis-methyl and methylene-bis-propyl anthranilate.

* * * * *